(12) United States Patent
Huang et al.

(10) Patent No.: US 8,534,619 B2
(45) Date of Patent: Sep. 17, 2013

(54) SUPPORT STAND FOR ELECTRONIC DEVICE

(75) Inventors: Cong Huang, Shenzhen (CN); Wen-Rong Chen, New Taipei (TW); Hui Li, Shenzhen (CN); Bin Du, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 166 days.

(21) Appl. No.: 13/210,748

(22) Filed: Aug. 16, 2011

(65) Prior Publication Data

US 2012/0223194 A1   Sep. 6, 2012

(30) Foreign Application Priority Data

Mar. 2, 2011  (CN) .......................... 2011 1 0049877

(51) Int. Cl.
*F16M 11/38* (2006.01)
(52) U.S. Cl.
USPC ........ 248/166; 248/163.1; 248/371; 248/454; 248/447; 248/460; 248/463; 248/918
(58) Field of Classification Search
USPC ................. 248/446, 447, 454, 455, 457, 458, 248/248/460, 462, 465, 918, 346.03, 349.1, 248/346.01, 163.1, 166, 371
See application file for complete search history.

(56) References Cited

U.S. PATENT DOCUMENTS

| | | | | |
|---|---|---|---|---|
| 544,049 | A | * | 8/1895 | Niemand ...................... 38/102.7 |
| 1,074,430 | A | * | 9/1913 | Hill ............................... 248/448 |
| 1,278,345 | A | * | 9/1918 | Hiatt ............................. 248/447 |
| 5,833,178 | A | * | 11/1998 | Plasse et al. ................. 248/27.8 |
| 7,213,794 | B1 | * | 5/2007 | Jefferies ........................ 248/460 |

* cited by examiner

*Primary Examiner* — Amy J. Sterling
(74) *Attorney, Agent, or Firm* — Altis Law Group, Inc.

(57) ABSTRACT

A support stand includes a first support assembly, a second support assembly, a first connecting assembly connecting one end of the first support assembly and the second support assembly. A second connecting assembly connects the other ends of the first support assembly and the second support assembly. The first support assembly includes two first support mechanisms, each first support mechanism includes a main body, and a first support rod hinged on the main body in a first direction. When the first support rods rotate around the first direction to a back side of the support stand, the first connecting assembly and the second connecting assembly are tilted by the first support rods and the second support assembly.

18 Claims, 8 Drawing Sheets

SUPPORT STAND FOR ELECTRONIC DEVICE

BACKGROUND

1. Technical Field

The exemplary disclosure relates to support stands for supporting electronic devices.

2. Description of Related Art

Support stands are used to support portable electronic devices of many different types and configurations, including but not limited to PDAs, tablet style personal computer (tablet PC), laptop computer, notebook, and personal stereos, can be placed on a desk or other supporting surfaces in an appropriate orientation to make it more comfortable for the users to view the display. However, the supporting angles of typical support stands cannot be adjusted to satisfy some requirements of the users.

Therefore, there is room for improvement within the art.

BRIEF DESCRIPTION OF THE DRAWINGS

Many aspects of the exemplary support stand for electronic device can be better understood with reference to the following drawings. These drawings are not necessarily drawn to scale, the emphasis instead being placed upon clearly illustrating the principles of the present support stand. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
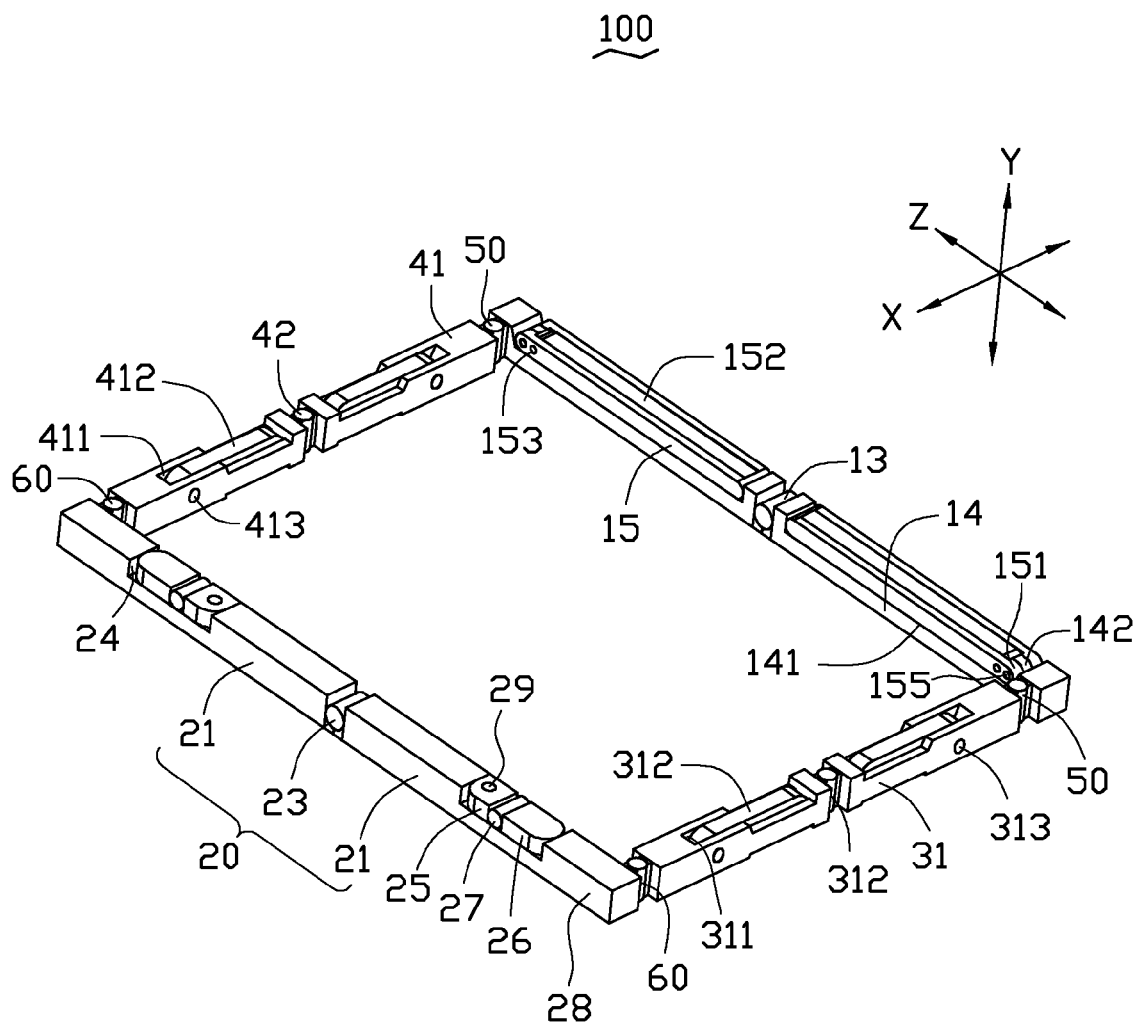
FIG. 1 is a schematic view of a support stand according to an exemplary embodiment.
Figure 2:
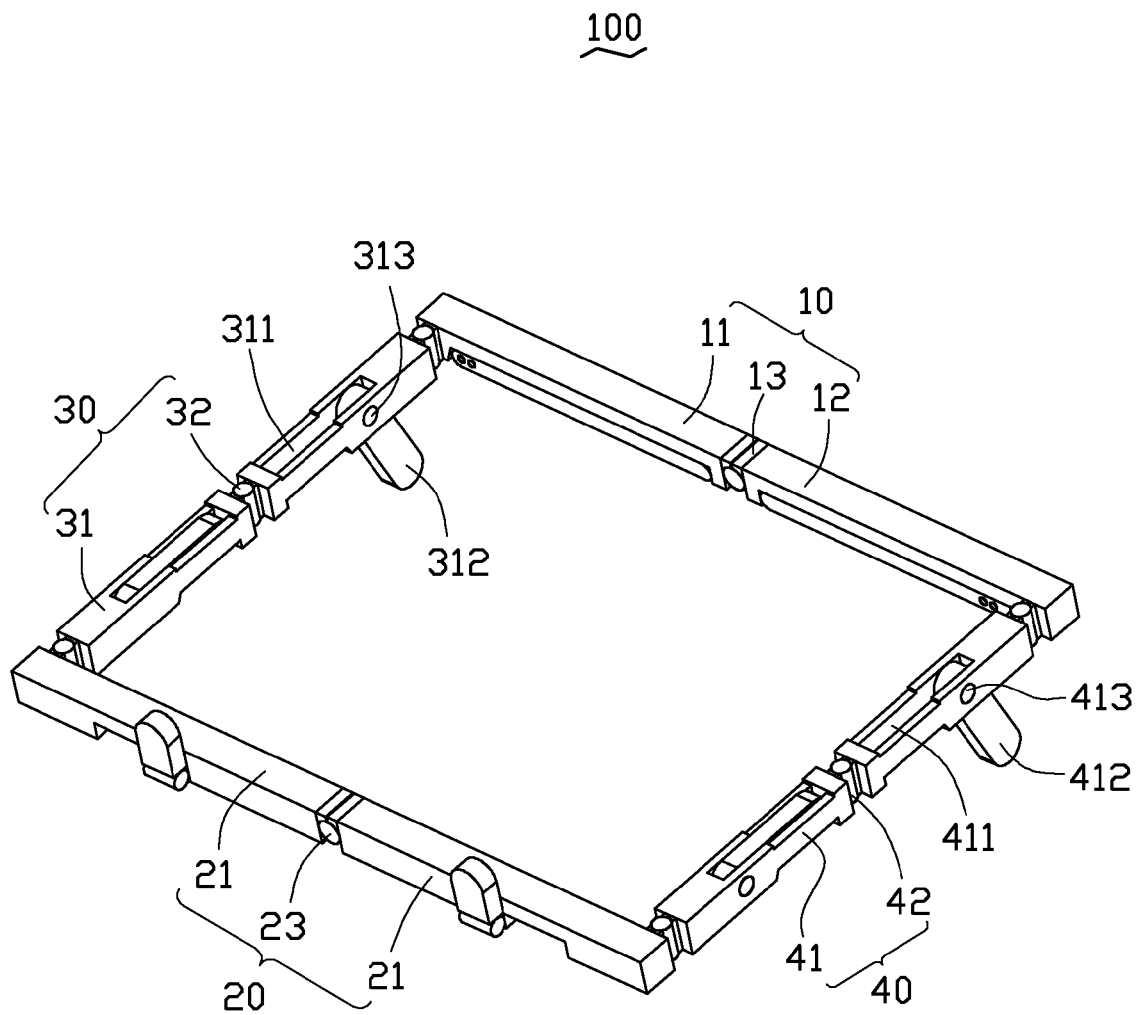
FIGS. 2-5 are schematic views of the support stand of FIG. 1 in different states.

An exemplary embodiment of a support stand 100 is shown in FIGS. 1 and 2. The support stand 100 includes a first support assembly 10, a second support assembly 20 spaced from the first support assembly 10, a first connecting assembly 30 and a second connecting assembly 40 opposite to the first connecting assembly 30. The first connecting assembly 30 connects between one end of the first support assembly 10 and one end of the second support assembly 20, the second connecting assembly 40 connects between the other end of the first support assembly 10 and the other end of the second support assembly 20.

Figure 4:
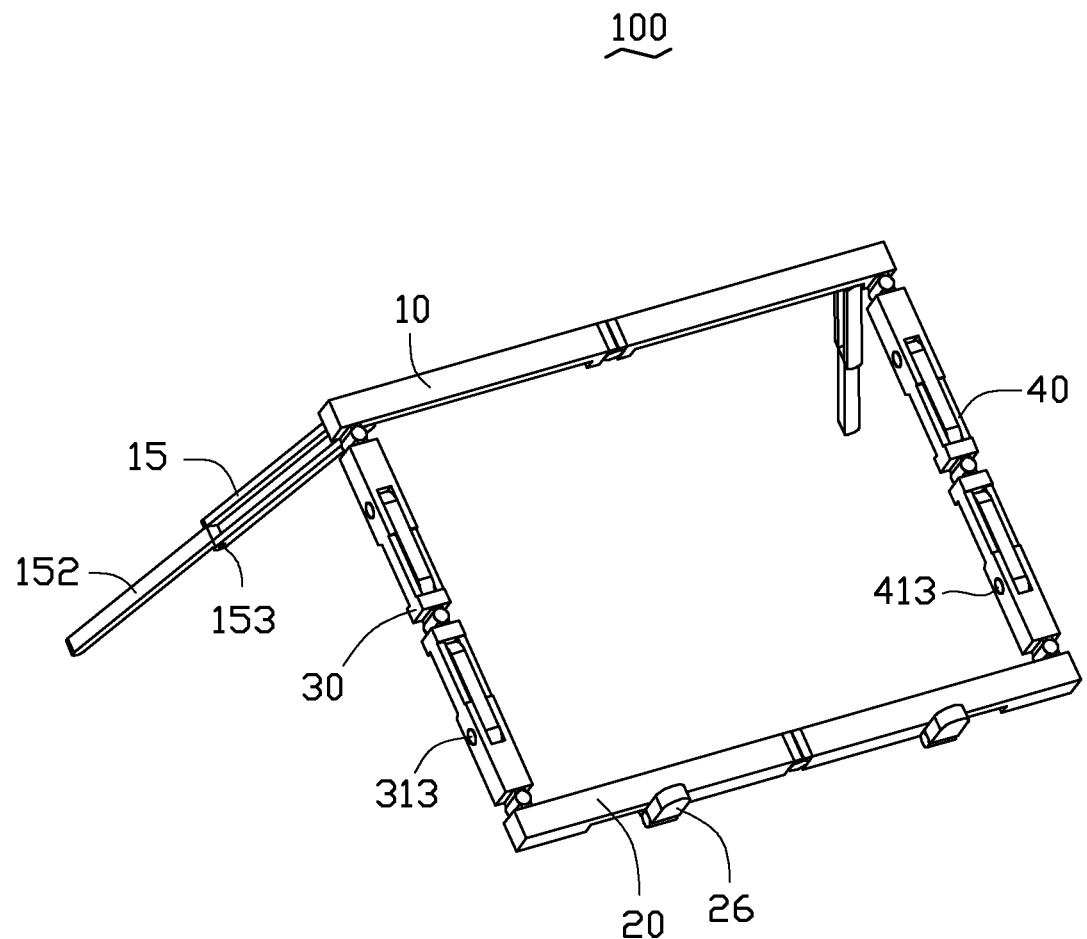

The first support assembly 10 includes two first support mechanism 11 and a first joint 13 hinging the two first support mechanisms 11 together about a first direction X. The two first support mechanisms 11 are substantially mirror images of each other about the first joint 13. Each first support mechanism 11 includes a main body 14 and a first support rod 15 hinged on the main body 14. In this exemplary embodiment, the main bodies 14 are hinged to each other by the first joint 13 so the first support mechanism 11 can be folded around the first direction X. Each main body 14 defines a recess 141 for accommodating corresponding first support rod 15 and has a jointing seat 142 formed near an end facing away from the first joint 13. Each first support rod 15 includes a joining end 151 hinged to corresponding jointing seat 142 by a peg 155 in the first direction X so the first support rods 15 are hinged to the main bodies 14 and can be folded around jointing seats 142. Each first support rod 15 may further define a compartment 154; each first support mechanism 11 further has a lengthening rod 152 (shown in FIG. 4) hinged to a corresponding first support rod 15 and accommodated in a corresponding compartment 154. In this exemplary embodiment, each lengthening rod 152 is hinged to a corresponding joining end 151 by a first shaft 153 (shown in FIG. 4) in the first direction X.

The second support assembly 20 includes two second support mechanisms 21 and a second joint 23. The second joint 23 hinges the second support mechanisms 21 together in the first direction X so the second support mechanisms 21 can be folded around the first direction X. Each second support mechanism 21 includes a second support rod 28, a connecting block 25 hinged to the second support rod 28 by a pole 29 in a second direction Y perpendicular to the first direction X. In addition, a second shaft 27 hinged on the connecting block 25 along the first direction X, a stopping block 26 hinged on the second shaft 27 opposite to the connecting block 25. Each connecting block 25 can rotate around the corresponding pole 29 about the second direction Y. Each stopping block 26 can rotate around the corresponding second shaft 27 about the first direction X. In this exemplary embodiment, each second support rod 28 defines a slot 24 accommodating the corresponding second shaft 27, the corresponding connecting block 25, and the corresponding stopping block 26.

The first connecting assembly 30 includes two first connecting rods 31 and a third joint 312. The third joint 312 hinges the first connecting rods 31 together in the second direction Y so the first connecting rods 31 can be folded around the second direction Y. Each first connecting rod 31 defines a first hole 311 therethrough in the second direction Y. The first connecting assembly 30 further includes two third support rods 312, each of which is hinged in one of the first hole 311, e.g., by a third shaft 313 located in one corresponding first hole 311 along a third direction Z perpendicular to the first direction X and the second direction Y.

The second connecting assembly 40 may have the same structure as the first connecting assembly 30. The second connecting assembly 40 includes two second connecting rods 41 and a fourth joint 42. The fourth joint 42 hinges the second connecting rods 41 together in the second direction Y so the second connecting rods 41 can be folded around the second direction Y. Each second connecting rod 41 defines a second hole 411 therethrough in the second direction Y. The second connecting assembly 40 further includes two fourth support rods 412, each of which is hinged in one of the second holes 411, e.g., by a fourth shaft 413 located in one corresponding second hole 411 along the third direction Z.

Figure 6:
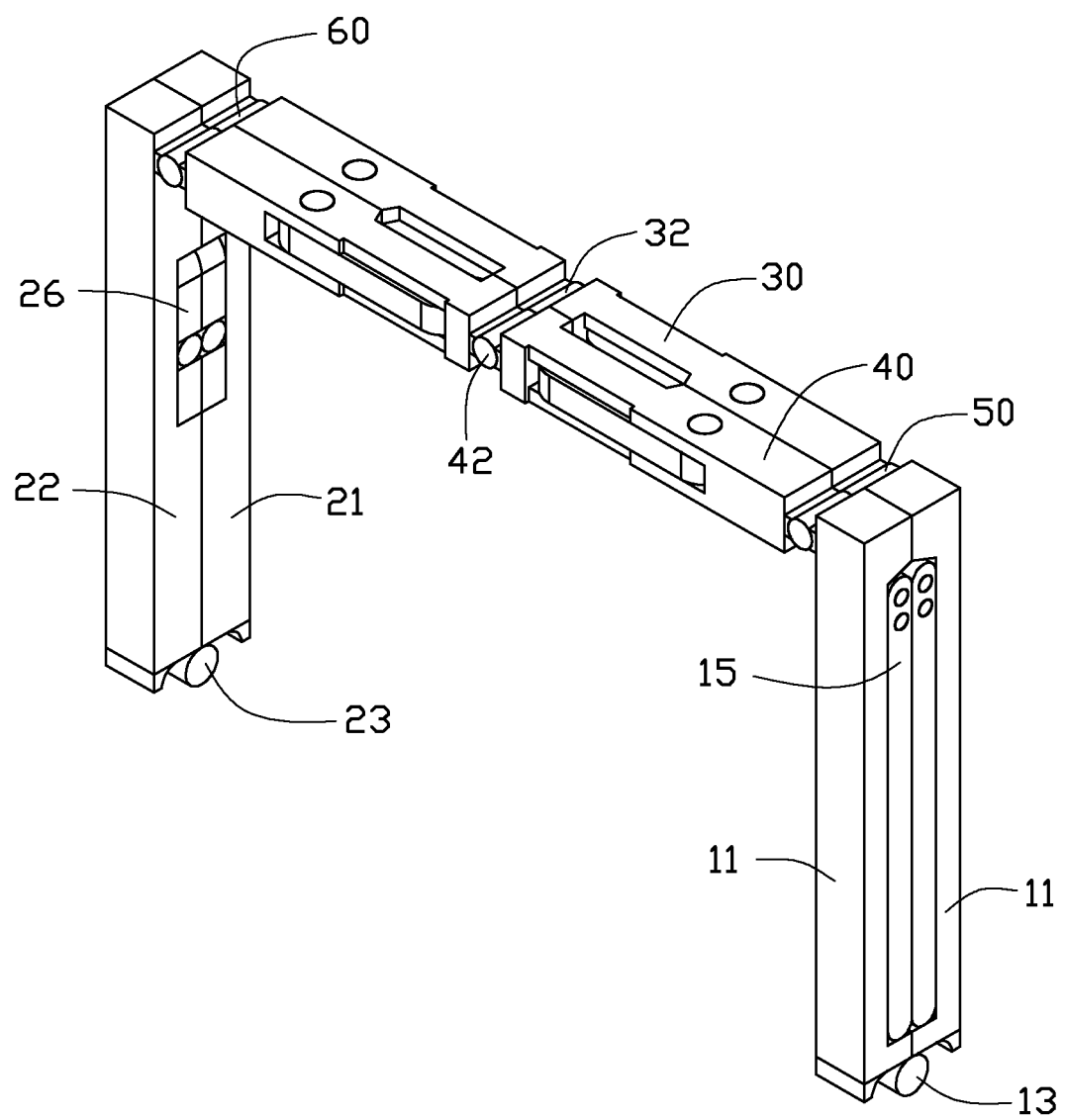
FIGS. 6-8 are schematic views of folding the support stand in different states.

Referring to FIGS. 1 and 6, each first support mechanism 11 is hinged to one of the first connecting assemblies 30 and the second connecting assembly 40 by a fifth joint 50 in the second direction Y. So the first connecting assembly 30 and the second connecting assembly 40 can be folded around the fifth joints 50 after the first support mechanisms 11 are folded around the first joint 13 and the second support rods 28 are folded around the second joint 23. Each second support rod 28 is hinged to one of the first connecting assemblies 30 and the second connecting assembly 40 by a sixth joint 60 in the second direction Y. So the first connecting assembly 30 and the second connecting assembly 40 can be folded around the sixth joints 60 after the first support mechanisms 11 are folded around the first joint 13 and the second support rods 28 are folded around the second joint 23.

Figure 3:
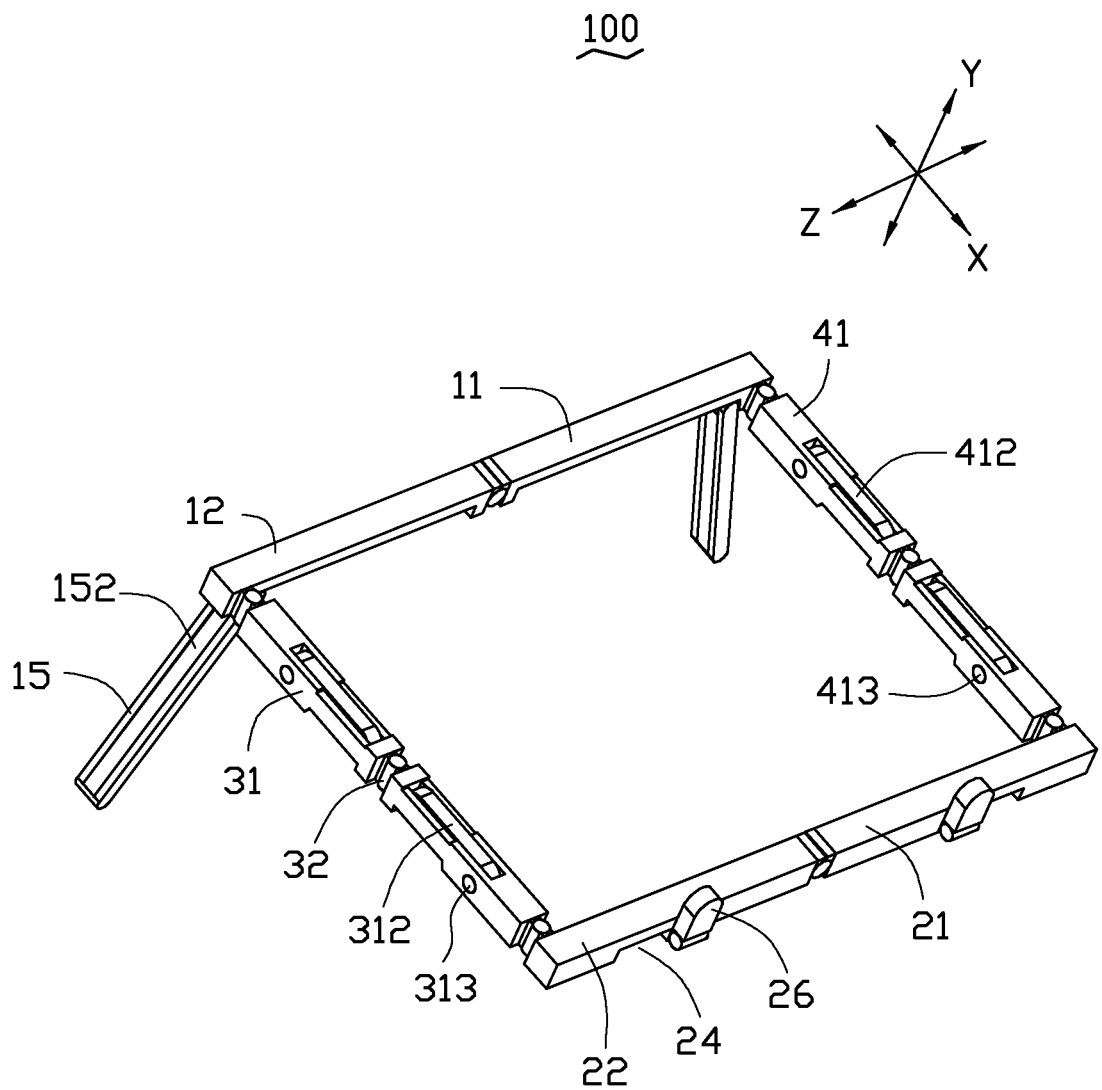

Referring to FIGS. 1 and 3, a first state of the support stand 100 is illustrated. The first support rods 15 are rotated around the jointing seats 142 relative to corresponding main body 14, until the first support rods 15 are rotated to a back side of the support stand 100 like shown in FIG. 3. At this time, the first support rods 15 and the second support rods 28 tilt the first connecting assembly 30 and the second connecting assembly 40 so the support stand 100 can stand on an angle on a support surface by the first support rods 15 and the second support rods 28. Additionally, the connecting blocks 25 may be rotated around the poles 29 to make the stopping blocks 26 become exposed from the second support rods 28. In addition, the stopping blocks 26 are rotated around the second shafts 27 to a front side of the support stand 100 opposite to the first support rods 15, to stop an electronic device located on the support stand 100 from sliding down. Furthermore, the lengthening rods 152 can be rotated around first shafts 153 to lengthen the first support rods 15, to adjust an angle of the support stand 100 like shown in FIG. 4. In the first state, the support stand 100 can support an electronic device in landscape orientation.

Figure 5:
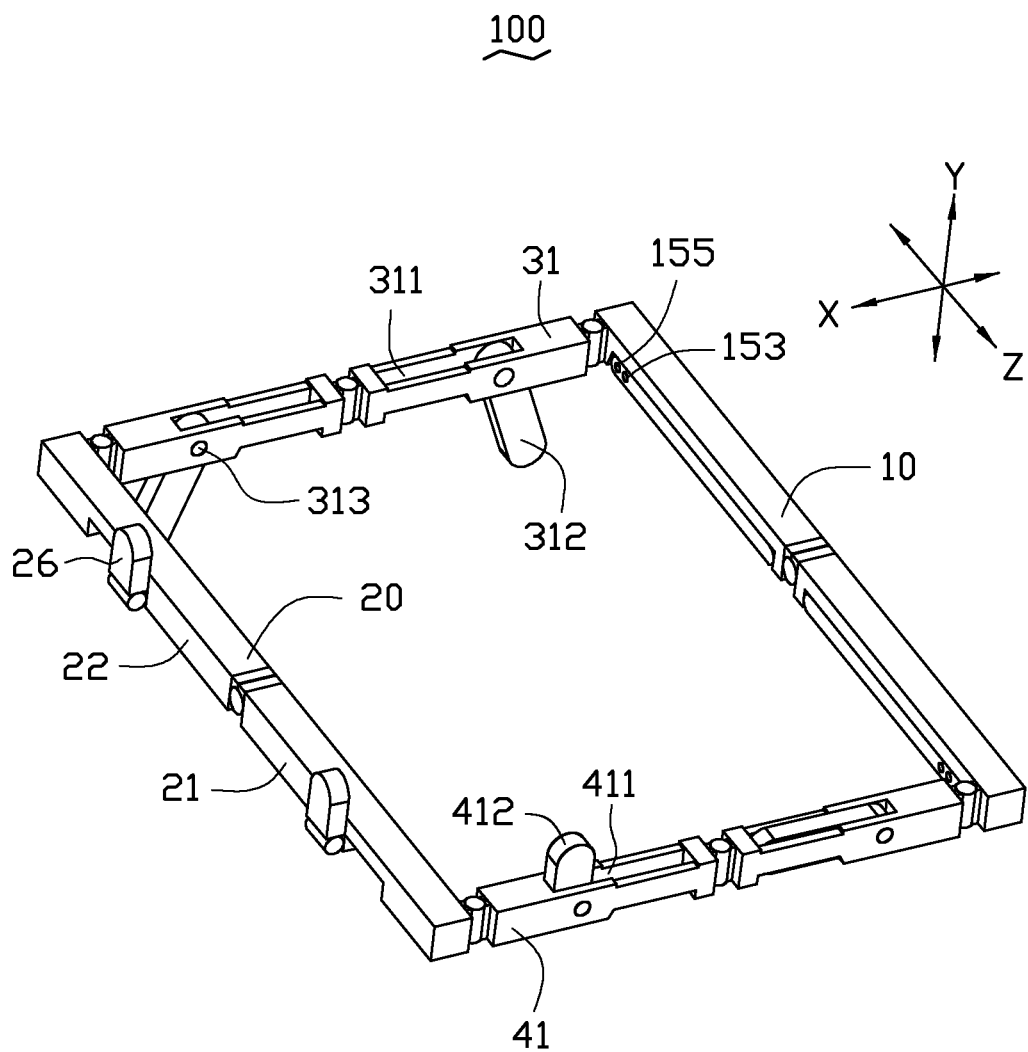

Referring to FIGS. 1 and 5, a second state of the support stand 100 is illustrated. The third support rods 312 are rotated around the third shafts 313 relative to corresponding first connecting rod 31, until the third support rods 312 are rotated to the back side of the support stand 100 like shown in FIG. 5. At this time, the third support rods 312 and the second connecting rods 41 tilt the first support assembly 10 and the second support assembly 20 so the support stand 100 can stand at an angle on a support surface by the third support rods 312 and the second connecting rods 41. Additionally, the fourth support rods 412 may rotate around the fourth shafts 413 until the fourth support rods 412 rotate to the front side of the support stand 100 to stop an electronic device located on the support stand 100 from sliding down. In the second state, the support stand 100 can support electronic device in portrait orientation.

Figure 7:
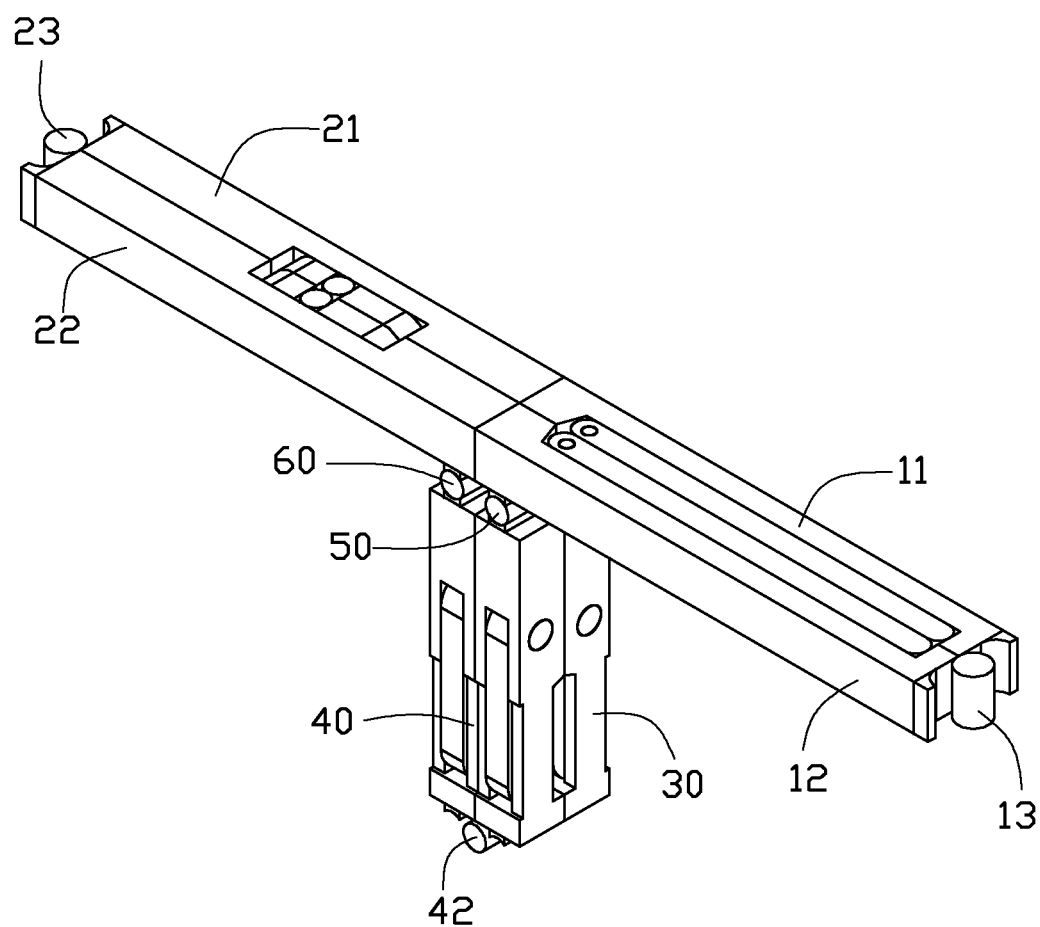
Figure 8:
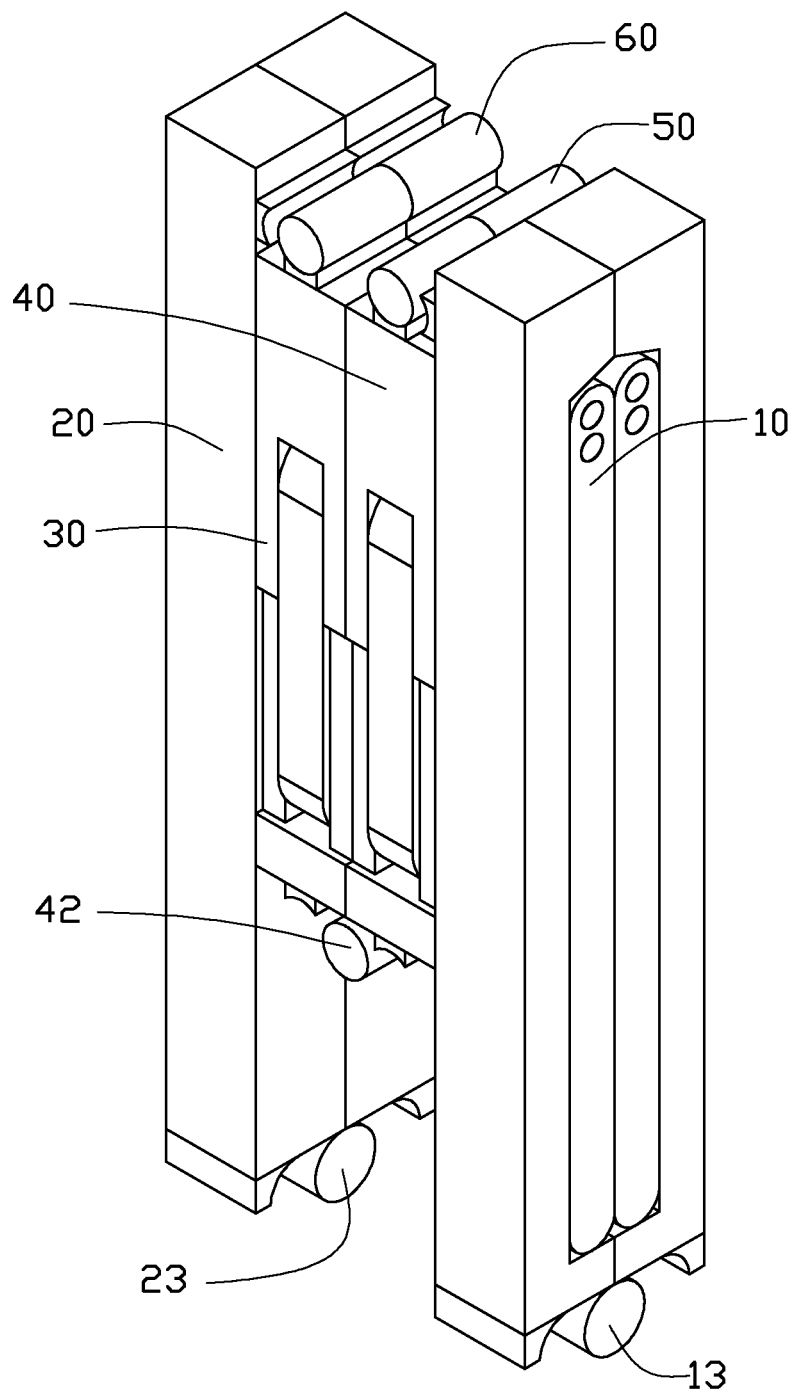

Referring to FIGS. 6 to 8, a third state for the portability of the support stand 100 is illustrated. The first support mechanisms 11 are folded around the first joint 13 and the second support rods 28 are folded around the second joint 23 until the first connecting assembly 30 and the second connecting assembly 40 are stacked like shown in FIG. 6. At this time, the third joint 312 and the second joint 23 are co-axial. The first connecting rods 31 are folded around the third joint 312 and the second connecting rods 41 are folded around the fourth joint 42 until the first connecting rods 31 are stacked together and the second connecting rods 41 are stacked together like shown in FIG. 7. Then, the first support mechanisms 11 are folded around the fifth joints 50 and the second support rods 28 are folded around the sixth joints 60 until the first support assembly 10, the second support assembly 20, the first connecting assembly 30 and the second connecting assembly 40 are stacked like shown in FIG. 8.

In the first and second states, the support stand 100 has varying shapes which are helpful to position the electronic device to slop in different view angles and in different display orientations to satisfy the varying requirements of the users. In the third state, the support stand 100 has a compact size and shape which is easily portable by users when travelling or when it is otherwise not used.

It is to be understood, however, that even through numerous characteristics and advantages of the exemplary disclosure have been set forth in the foregoing description, together with details of the system and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A support stand comprising:
   a first support assembly;
   a second support assembly spaced from the first support assembly;
   a first connecting assembly pivotably connecting between the first support assembly and the second support assembly;
   a second connecting assembly opposite to the first connecting assembly, the second connecting assembly pivotably connecting between the first support assembly and the second support assembly;
   wherein the first support assembly comprises two first support mechanisms and a first joint hinging the first support mechanisms together, the second support assembly comprises two second support mechanisms and a second joint hinging the second support mechanisms together, each first support mechanism comprises a main body and a first support rod hinged on the main body in a first direction;
   when the first support rods rotate around the first direction to a back side of the support stand, the first connecting assembly and the second connecting assembly are tilted by the first support rods and the second support assembly;
   when the first support mechanisms are folded around the first joint in the first direction and the second support mechanism are folded around the second joint in the first direction, the first support mechanisms overlap each other and the second support mechanisms overlap each other.

2. The support stand of claim 1, wherein each second support mechanism comprises a second support rod, a connecting block hinged to the second support rod in a second direction perpendicular to the first direction, a second shaft hinged on the connecting block in the first direction, a stopping block hinged on the second shaft opposite to the connecting block.

3. The support stand of claim 2, wherein after the connecting blocks rotate around the second direction to make the stopping blocks expose from the second support rods, the stopping blocks is capable of rotating around the first direction to the front side of the support stand opposite to the first support rods.

4. The support stand of claim 2, wherein the first connecting assembly comprises two first connecting rods and two third support rods, each third support rod is hinged in one of the first connecting rods in a third direction perpendicular to the first direction and the second direction.

5. The support stand of claim 4, wherein the first connecting assembly further comprises a third joint hinging the first connecting rods together in the second direction so the first connecting rods is capable of being folded around the second direction.

6. The support stand of claim 5, wherein each first connecting rod defines a first hole therethrough in the second direction, each third support rod is hinged in one of the first hole.

7. The support stand of claim 2, wherein the second connecting assembly comprises two second connecting rods and two fourth support rods, each fourth support rod is hinged in one of the second connecting rods in a third direction perpendicular to the first direction and the second direction.

8. The support stand of claim 7, wherein the second connecting assembly further comprises a fourth joint hinging the first connecting rods together in the second direction so the second connecting rods is capable of being folded around the second direction.

9. The support stand of claim 7, wherein each second connecting rod defines a second hole therethrough in the second direction, each fourth support rod is hinged in one of the second hole.

10. The support stand of claim 2, wherein each first support mechanism is hinged to one of the first connecting assembly and the second connecting assembly by a fifth joint in the second direction.

11. The support stand of claim 10, wherein each second support rod is hinged to one of the first connecting assembly and the second connecting assembly by a sixth joint in the second direction.

12. The support stand of claim 1, wherein each first support mechanism further comprises a lengthening rod, which is hinged to corresponding first support rod in the first direction; the lengthening rods is capable of rotating around the first direction to lengthen the first support rods.

13. A support stand comprising:
a first support assembly;
a second support assembly spaced from the first support assembly;
a first connecting assembly connecting one ends of the first support assembly and the second support assembly;
a second connecting assembly opposite to the first connecting assembly, the second connecting assembly connecting the other ends of the first support assembly and the second support assembly;
wherein the first connecting assembly comprises two first connecting rods and two third support rods, each third support rod is hinged in one of the first connecting rods; when the third support rods rotate relative to corresponding first connecting rod to a back side of the support stand, the first support assembly and the second support assembly are tilted by the third support rods.

14. The support stand of claim 13, wherein the second connecting assembly comprises two second connecting rods and two fourth support rods, each fourth support rod is hinged in one of the second connecting rods.

15. The support stand of claim 14, wherein the fourth support rods is capable of rotating to a front side of the support stand opposite to the third support rods.

16. The support stand of claim 14, wherein each second connecting rod defines a second hole therethrough, each fourth support rod is hinged in one of the second hole.

17. A support stand comprising:
a first support assembly;
a second support assembly spaced from the first support assembly;
a first connecting assembly pivotably connecting between the first support assembly and the second support assembly;
a second connecting assembly opposite to the first connecting assembly, the second connecting assembly pivotably connecting between the first support assembly and the second support assembly;
wherein the first support assembly comprises two first support mechanisms pivotably connected to each other, each first support mechanism comprises a main body and a first support rod hinged on the main body in a first direction; when the first support rods rotate around the first direction to a back side of the support stand, the first connecting assembly and the second connecting assembly are tilted by the first support rods and the second support assembly;
wherein the second support assembly comprises two second support mechanisms, each second support mechanism comprises a second support rod, a connecting block hinged to the second support rod in a second direction perpendicular to the first direction, a second shaft hinged on the connecting block in the first direction, a stopping block hinged on the second shaft opposite to the connecting block.

18. The support stand of claim 17, wherein after the connecting blocks rotate around the second direction to make the stopping blocks expose from the second support rods, the stopping blocks is capable of rotating around the first direction to the front side of the support stand opposite to the first support rods.

* * * * *